(12) United States Patent
Li et al.

(10) Patent No.: US 12,522,513 B2
(45) Date of Patent: Jan. 13, 2026

(54) MINERALIZED IRON-CARBON COMPOSITE MATERIAL, PREPARATION METHOD THEREFOR, AND APPLICATION THEREOF

(71) Applicant: BCEG ENVIRONMENT REMEDIATION CO., LTD, Beijing (CN)

(72) Inventors: Shupeng Li, Beijing (CN); Lili Guo, Beijing (CN); Ting Qu, Beijing (CN); Yaru Liu, Beijing (CN); Jiachen Li, Beijing (CN); Yong Wang, Beijing (CN); Qi Wang, Beijing (CN); Jing Xiong, Beijing (CN); Jinmei Xue, Beijing (CN)

(73) Assignee: BCEG ENVIRONMENT REMEDIATION CO., LTD, Beijing (CN)

( * ) Notice: Subject to any disclaimer, the term of this patent is extended or adjusted under 35 U.S.C. 154(b) by 0 days.

(21) Appl. No.: 18/725,053

(22) PCT Filed: Dec. 28, 2021

(86) PCT No.: PCT/CN2021/142217
§ 371 (c)(1),
(2) Date: Jun. 27, 2024

(87) PCT Pub. No.: WO2023/122998
PCT Pub. Date: Jul. 6, 2023

(65) Prior Publication Data
US 2025/0059061 A1  Feb. 20, 2025

(51) Int. Cl.
| | |
|---|---|
| *B01J 20/20* | (2006.01) |
| *C01G 49/00* | (2006.01) |
| *C02F 1/467* | (2023.01) |
| *C04B 35/528* | (2006.01) |
| *C02F 101/22* | (2006.01) |
| *C02F 103/00* | (2006.01) |

(52) U.S. Cl.
CPC ............ *C01G 49/00* (2013.01); *B01J 20/20* (2013.01); *C02F 1/4678* (2013.01); *C04B 35/528* (2013.01); *C01P 2006/40* (2013.01); *C02F 2101/22* (2013.01); *C02F 2103/005* (2013.01)

(58) Field of Classification Search
CPC ................... B01J 20/20; C04B 35/528
See application file for complete search history.

(56) References Cited

U.S. PATENT DOCUMENTS

| | | | |
|---|---|---|---|
| 6,989,102 B1 | 1/2006 | Park et al. | |
| 2016/0138128 A1* | 5/2016 | Nicolay | C22B 3/08 435/262 |
| 2020/0318062 A1 | 10/2020 | Lin | |

FOREIGN PATENT DOCUMENTS

| | | |
|---|---|---|
| CN | 101759438 A | 6/2010 |
| CN | 103789296 A | 5/2014 |
| CN | 103803704 A | 5/2014 |
| CN | 106046399 A | 10/2016 |
| CN | 107352768 A | 11/2017 |
| CN | 110330082 A | 10/2019 |
| CN | 110423065 A | 11/2019 |
| CN | 111139084 A | 5/2020 |
| CN | 111377497 A | 7/2020 |
| CN | 111377499 A | 7/2020 |
| CN | 112028517 A | 12/2020 |
| CN | 112830575 A | 5/2021 |
| CN | 112961392 A | 6/2021 |
| CN | 113275374 A | 8/2021 |
| JP | 2006-142149 A | 6/2006 |

OTHER PUBLICATIONS

Yi, D. et al., "Mechanism of Microbially Induced Carbonate Precipitation and Its Application in the Field of Heavy Metal Immobilization," Environmental Science and Technology, vol. 43, Issue 9, pp. 87-92 (Sep. 2020).
Song, M. et al., "A review on the applications of microbially induced calcium carbonate precipitation in solid waste treatment and soil remediation," Chemosphere, vol. 290 (Mar. 2022).
International Search Report and Written Opinion of the International Searching Authority dated Aug. 29, 2022 as received in Application No. PCT/CN2021/142217.
CN First Office Action dated Sep. 5, 2022 as received in Application No. 202111636538.8.
CN Second Office Action dated Mar. 26, 2023 as received in Application No. 202111636538.8.

\* cited by examiner

*Primary Examiner* — Stuart L Hendrickson
(74) *Attorney, Agent, or Firm* — Maschoff Brennan

(57) ABSTRACT

An iron-carbon composite material, a preparation method therefor, and an application thereof related to microbial technology applications. The method includes the following steps: a cross-linking and curing step: carrying out cross-linking and curing to iron powder and biological activated carbon by using an alkaline earth metal salt and a cross-linking agent; and a mineralization treatment step: soaking the cross-linked and cured iron-carbon composite material in a mineralization bacteria solution for 5-15 min, and carrying out drying to obtain an iron-carbon composite material. Mineralization bacteria utilize alkaline earth metal ions to form an alkaline earth metal carbonate structure on the surface of the iron-carbon composite material, thereby greatly improving the strength of the iron-carbon composite material; in addition, the soaking time in the mineralization bacteria solution is controlled to prevent the formation of a compact metal carbonate film from affecting the functioning of effective components in the iron-carbon composite material.

6 Claims, 3 Drawing Sheets

MINERALIZED IRON-CARBON COMPOSITE MATERIAL, PREPARATION METHOD THEREFOR, AND APPLICATION THEREOF

TECHNICAL FIELD

The present disclosure relates to the field of microbial technology applications, in particular to an iron-carbon composite material, a preparation method therefor, and application thereof.

BACKGROUND

Zero-valent iron has an active chemical property and a strong reducing capacity. A large number of studies have shown that the zero-valent iron can not only degrade a chlorinated organic compound in a water body, but also reduce and remove heavy metal, azo dyes, nitroaromatic, nitrates, perchlorates, herbicides and various other pollutants, which greatly promote application of the zero-valent iron in the aspect of environmental pollution treatment. The zero-valent iron which is low in price is usually used as a filler or an injectant in a permeable reactive barrier and in-situ injection technologies. With reaction of the zero-valent iron, hydroxides are gradually deposited on a surface of the iron and block internal iron powder from participating in the reaction, which results in weakening of a redox reaction and decrease of capacity for treating the pollutants.

An iron-carbon composite material is formed by curing and combining of carbon and zero-valent iron and serves as a micro-electrolysis filler, which can effectively prevent enrichment of sediments on a surface of the iron powder and thus more efficiently treat the pollutants. At present, carbon and iron may be combined in a cross-linking curing manner or a sintering curing manner to form a stable micro-electrolysis material. Cross-linking curing combination means that carbon and iron are bonded by a cross-linking curing agent and cured and combined together, for example, in a patent application CN111377497A, sodium alginate and calcium chloride are used as the cross-linking curing agent for curing and combining iron, carbon and maifan stone to form a material, so as to remove phosphorus particles in water. In a patent application CN110330082A, the sodium alginate and calcium chloride are used as the cross-linking curing agent for curing and combining iron and carbon to form a material, which serves as a catalyst for catalyzing sodium persulfate so as to treat ibuprofen pollution. However, as for a simple cross-linking curing manner, a use amount of a curing agent is large, strength of an obtained iron-carbon material is low, which cannot meet the requirement of an operation with a high mechanical strength in the in-situ injection technology or the permeable reactive barrier technology and may be disintegrated quickly in a water environment where microorganisms exist and then lose structural features.

Sintering curing solves the problem of the material strength. However, a material needs to be processed in a high temperature of hundreds of degrees centigrade for several hours in a sintering process, so energy consumption is extremely high, surface hardening may also occur to the material in the high temperature, an original slow release porous channel is sealed, part of iron powder and carbon powder and other active materials are locked inside a cured material and cannot react with the outside, so a material utilization rate is low.

Thus, to search for an iron-carbon composite material with a high compressive strength and a good sewage treatment effect is a technical problem urgent to be solved in popularization and application of a current iron-carbon catalyst product.

SUMMARY OF THE INVENTION

Thus, objectives of the present disclosure are to provide an iron-carbon composite material with a high compressive strength and a good sewage treatment effect, a preparation method therefor, and application thereof.

For this, the present disclosure provides a preparation method for an iron-carbon composite material, including the following steps:
  a cross-linking and curing step: carrying out cross-linking and curing to iron powder and carbon powder by using an alkaline earth metal salt and a cross-linking agent; and
  a mineralization treatment step: soaking the cross-linked and cured iron-carbon composite material in a mineralization bacteria solution for 5-15 min, and carrying out drying to obtain an iron-carbon composite material.

Preferably, the soaking time ranges from 5 min to 10 min.

Preferably, a mineralization bacterium is selected from one or more types of *Myxococcus xanthus*, sulfate reducing bacteria, denitrifying bacteria and *Bacillus pasteurii*.

Preferably, the sulfate reducing bacteria are selected from one or more types of ordinary *Desulfovibrio*, *Spirillum desulfuricans* and *Desulfovibrio spore*.

Preferably, the denitrifying bacteria are selected from one or more types of *Thiobacillus Denitrificans*, *Pseudomonas*, *Alcaligenes*.

Preferably, the *Pseudomonas* includes one or more types of *Pseudomonas aeruginosa*, *Pseudomonas fluorescens*, *Pseudomonas mallei* and *Pseudomonas pseudomallei*.

Preferably, the *Alcaligenes* includes one or more types of *Pseudoalcaligenes*, denitrification *Alcaligenes* and *Alcaligenes odorans*.

Preferably, an optical density ($OD_{600}$) of the mineralization bacteria solution at 600 nm ranges from 1 to 5; and preferably, 1 to 3.

Preferably, a method for preparing the mineralization bacteria solution includes the following steps: mixing mineralization bacteria powder, ammonium sulfate, urea and water for culturing.

Preferably, a culturing temperature ranges from 25° C. to 37° C., and culturing time ranges from 24 h to 72 h.

Preferably, a mass ratio of the mineralization bacteria powder to the ammonium sulfate to the urea to the water is: (20-30):(15-20):(10-15):(800-1200).

Preferably, after mixing the mineralization bacteria powder, the ammonium sulfate, the urea and the water, the method further includes a step of adjusting pH; and preferably, adjusting pH to be in a range from 6.5 to 9.5.

Preferably, before the step of drying, the method further includes a step of carrying out dispersion and bacteria solution leaching on the iron-carbon composite material.

Preferably, the dispersion is carried out by performing horizontal oscillation for 30 s to 60 s by using a screen having a mesh diameter in a range from 2.0 mm to 4.0 mm to disperse the bonded iron-carbon composite material.

Preferably, the bacteria solution leaching is carried out by performing horizontal oscillation for 30 s to 60 s by using a screen having a particle diameter in a range from 0.5 mm to 3.0 mm to leach out the redundant bacteria solution.

Preferably, the drying is carried out in a temperature ranging from 40° C. to 60° C. for a drying time ranging from 3 h to 5 h.

Preferably, the carbon powder is selected from one or both of activated carbon and graphite.

Preferably, the alkaline earth metal salt is selected from one or more of calcium chloride, calcium nitrate, zinc chloride and zinc nitrate.

Preferably, the cross-linking agent is sodium alginate.

Preferably, the cross-linking and curing step includes: mixing the iron powder, the carbon powder, the cross-linking agent and water, then adding the mixture into an alkaline earth metal salt solution for still standing, and carrying out solid-liquid separation and drying to obtain a cross-linked and cured iron-carbon composite material.

Preferably, a mass ratio of the iron powder to the carbon powder to the cross-linking agent is (40-80):(10-30):(3-6).

Preferably, the carbon powder has a particle diameter ranging from 200 meshes to 400 meshes.

Preferably, the iron powder is acid-pickled iron powder; and preferably, a method for preparing the acid-pickled iron powder includes: soaking iron powder in a 0.05-0.5 mol/L acid solution for at least 3 min, then carrying out solid-liquid separation, and washing to neutral.

Preferably, the iron powder has a particle diameter ranging from 200 meshes to 400 meshes.

Preferably, the acid solution is selected from one or more of a hydrochloric acid solution, a sulfuric acid solution and a nitric acid solution.

Preferably, the cross-linking and curing step is carried out in a water temperature ranging from 50° C. to 70° C.

Preferably, a mass ratio of a total mass of the acid-pickled iron powder, the carbon powder and the cross-linking agent to water is (3-5): 20.

Preferably, the alkaline earth metal salt solution has a mass percentage concentration ranging from 2% to 6%.

Preferably, in the cross-linking and curing step, adding the mixture into the alkaline earth metal salt solution is performed at a speed ranging from 5 mL/min to 15 mL/min.

Preferably, in the cross-linking and curing step, the still standing is performed for 30 min to 90 min.

Preferably, in the cross-linking and curing step, the drying is carried out in a temperature ranging from 40° C. to 60° C. for a drying time ranging from 6 h to 10 h.

Preferably, the obtained cross-linked and cured iron-carbon composite material has a particle diameter ranging from 1.2 mm to 3 mm.

The present disclosure further provides an iron-carbon composite material prepared by the above preparation method.

Preferably, the iron-carbon composite material has a particle diameter ranging from 1.5 mm to 3.5 mm.

The present disclosure further provides application of the iron-carbon composite material prepared by the above method in treating sewage.

The technical solutions of the present disclosure have the following advantages.

1. The method for preparing the iron-carbon composite material provided by the present disclosure includes the following steps: the cross-linking and curing step: carrying out cross-linking and curing to the iron powder and the carbon powder by using the alkaline earth metal salt and the cross-linking agent; and the mineralization treatment step: soaking the cross-linked and cured iron-carbon composite material in the mineralization bacteria solution for 5-15 min, and carrying out drying to obtain the iron-carbon composite material. The mineralization bacterium utilizes alkaline earth metal ions to form alkaline earth metal carbonates on a surface of the iron-carbon composite material, the alkaline earth metal carbonates are mutually connected and wrapped on a surface of a small sphere, and finally a coated structure is formed, thereby greatly improving the strength of the iron-carbon composite material; in addition, the soaking time in the mineralization bacteria solution is controlled to be in a range from 5 min to 15 min so as to guarantee that the mineralization bacterium transforms only part of alkaline earth metal ions on the surface of the iron-carbon composite material instead of excessively transforming the alkaline earth metal ions inside, thus the iron-carbon composite material may still maintain a slow release structure in the iron-carbon composite material, so as to prevent the formation of a compact alkaline earth metal carbonate film from affecting the functioning of effective components in the iron-carbon composite material, and then the iron-carbon composite material with the high compressive strength and good slow release performance is obtained.

2. According to the method for preparing the iron-carbon composite material provided by the present disclosure, the time for soaking the iron-carbon composite material in the bacteria solution is controlled to be in a range from 5 min to 10 min, so that an alkaline earth metal carbonate film structure formed on the surface of the iron-carbon composite material by the mineralization bacterium is more reasonable and better facilitates functioning of a reducing action of the effective components in the iron-carbon composite material.

3. According to the method for preparing the iron-carbon composite material provided by the present disclosure, the mineralization bacterium is selected from one or more of *Myxococcus xanthus*, sulfate reducing bacteria, denitrifying bacteria and *Bacillus pasteurii*. The above mineralization bacteria can more quickly form the alkaline earth metal carbonate film on the surface of the iron-carbon composite material, thereby improving the strength of the iron-carbon composite material; the carbon powder is selected from one or both of the activated carbon and graphite and can form a micro-electrolysis structure together with the iron powder; and the alkaline earth metal salt is selected from one or more of calcium chloride, calcium nitrate, zinc chloride and zinc nitrate and can bond the iron powder and the carbon powder together with the cross-linking agent, and meanwhile, a material basis is provided for the mineralization bacteria playing a role in mineralization.

4. According to the method for preparing the iron-carbon composite material provided by the present disclosure, when the $OD_{600}$ of the mineralization bacteria solution ranges from 1 to 5, a mineralization speed is better controlled, which is suitable for forming the alkaline earth metal carbonate film structure and on the one hand, improves the strength of the iron-carbon composite material and on the other hand prevents formation of the compact film by the alkaline earth metal carbonate film from wrapping the iron-carbon composite material and losing the reduction action for treating sewage.

5. According to the method for preparing the iron-carbon composite material provided by the present disclosure, by controlling the mass ratio of the iron powder to the carbon powder to the cross-linking agent to be (40-80):(10-30):(3-6), a redox reaction efficiency of the iron-carbon composite material is improved.

6. According to the method for preparing the iron-carbon composite material provided by the present disclosure, the acid-pickled iron powder is used as a raw material, an oxide film on a surface of the iron powder is removed through acid pickling, and thus reduction activity of the iron powder is improved.

7. According to the method for preparing the iron-carbon composite material provided by the present disclosure, carbon and iron are combined to form a micro-electrolysis structure, which accelerates electron exchange in a reaction system, facilitates oxidization of the iron and reduction of the pollutants, and has a higher capacity and higher efficiency for treatment of the pollutants. Meanwhile, the iron powder is blocked by the carbon powder and is not prone to aggregation, deposition sites of hydroxides are dispersed, reaction activity is maintained for a longer time, a main component of the iron-carbon composite material provided by the present disclosure is alginate, organisms are decomposed through the mineralization bacterium, the alkaline earth metal carbonate is formed on the carbon-iron surface under the condition of the alkaline earth metal ions, so the mechanical strength is improved remarkably, it is not prone to disintegration in a process of agent mixing and iron-carbon composite material wall-building, and meanwhile, the alkaline earth metal carbonate for wrapping is of a porous structure and does not block functioning of the iron-carbon material inside.

BRIEF DESCRIPTION OF THE DRAWINGS

In order to more clearly describe specific implementations of the present disclosure or technical solutions in the prior art, the accompanying drawings needed in the description for the specific implementations or the prior art will be briefly introduced below. Apparently, the accompanying drawings in the following description are some implementations of the present disclosure. Those ordinarily skilled in the art may also obtain other accompanying drawings according to these accompanying drawings without making creative work.

DETAILED DESCRIPTION

Figure 1:
FIG. 1 is a picture of an appearance of a cross-linked and cured iron-carbon composite material in a preparation method of Embodiment 1 of the present disclosure.
Figure 2:
FIG. 2 is a picture of an appearance of an iron-carbon composite material treated by a mineralization bacteria solution prepared by a method of Embodiment 1 of the present disclosure.

The following embodiments are provided for better further understanding the present application, which are not limited to the preferable implementations and do not constitute a limitation on the content and the protection scope of the present disclosure, and any product the same as or similar to the present disclosure obtained by anybody under the inspiration of the present disclosure or by combining the present disclosure with features in the other prior art falls within the protection scope of the present disclosure.

Where specific experimental steps or conditions are not indicated in the embodiments can be performed according to operations of conventional experimental steps or conditions described by documents in the art. Whatever reagent or instrument used with no indicated manufacturer may be a conventional reagent product obtained through market purchase.

In the following embodiments of the present disclosure, the adopted *Bacillus pasteurii* has a collection number: ATCC 11859, which is purchased from American type culture collection. The adopted *Myxococcus xanthus* has a collection number: ATCC 25232, which is purchased from American type culture collection.

In the experimental examples of the present disclosure, 1000 μg/mL hexavalent chromium solution standard substance is purchased from Shangcheng Beinachuanglian Biotechnology Company limited and has a product number of BWZ6851-2016.

In the following embodiments of the present disclosure, reduction iron powder is ultrafine high-purity iron powder purchased from Nangong Zhongzhou alloy material Co., Ltd.; the biological activated carbon powder is powdery activated carbon purchased from Henan Songshan technology Co., Ltd., which a material includes a peach shell, a coconut shell, an apricot shell and a walnut shell; sodium alginate powder is purchased from Guangzhou Changyu Chemical Co., Ltd. and has a model number of HG80; and graphite powder is 1000-mesh graphite powder purchased from Qingdao Dongkai graphite Co., Ltd.

Embodiment 1

A method for preparing an iron-carbon composite includes the following steps.

(1) Acid-pickled iron powder is prepared: 500 g of reduction iron powder is milled to 200 meshes, put in 1000 mL of 0.1 mol/L hydrochloric acid, stirred for 5 min, then subjected to reduced-pressure filtration, washed with deionized water till a pH value of a filtrate reaches 7.2, dried in a vacuum oven at 50° C. for 2 h, and stored in an oxygen-free environment.

(2) Cross-linking and curing are carried out: biological activated carbon is milled to 200 meshes to obtain activated carbon powder; 375 g of dry acid-pickled iron powder, 100 g of activated carbon powder and 25 g of sodium alginate powder are taken for preparing a total of 500 g of mixed powder, the mixed powder is added into 2 kg of 60° C. water under stirring, continuous stirring is performed for 10 min, a whole suspension is uniform without particle aggregation and has a certain viscosity, and a suspension is obtained; and under the stirring condition, the suspension is pumped into a $CaCl_2$) solution with a mass percentage concentration of 3% at a pumping speed of 10 mL/min through a flexible tube with an internal diameter of 0.5 mm, still standing is performed for 60 min, then a screen with a mesh diameter of 1 mm is used for dispersing the iron-carbon composite material, then the iron-carbon composite material is put in the vacuum oven and dried at 50° C. for 8 h, then a cross-linked and cured iron-carbon composite material is obtained and stored in the oxygen-free environment, 25 particles of the cross-linked and cured iron-carbon composite material are taken randomly and each have a particle diameter in a range from 1.2 mm to 3 mm measured by a vernier caliper, and an average particle diameter is 1.84 mm.

(3) Mineralization is performed by using a mineralization bacterium:
  a bacteria solution is prepared: 20 g of *Bacillus pasteurii* powder, 20 g of ammonium sulfate and 10 g of urea are weighed and mixed, 1 L of water is added, a pH value is adjusted to be 7.54, fermentation culture is performed for 72 h under a condition of 25° C., and then $OD_{600}$ of an obtained bacteria solution is 4.7;
  mineralization treatment is performed: the cross-linked and cured iron-carbon composite material obtained in step (2) is put in the screen with the mesh diameter of 1 mm, soaked in the bacteria solution for 10 min and then taken out;
  dispersion and bacteria solution leaching are performed: the iron-carbon composite material is put in a hierarchical oscillation sieve to be horizontally oscillated for 60 s; a mesh diameter of an upper layer is 3.0 mm for implementing dispersion of the iron-carbon composite material; and a mesh diameter of a lower layer is 1.5 mm for leaching out redundant bacteria solutions; and
  drying is carried out: the mineralized iron-carbon composite material is put in the vacuum oven to be dried at 50° C. for 4 h, 25 particles are taken randomly and each have a particle diameter measured in a range from 1.9 mm to 3.5 mm, and an average particle diameter is 2.6 mm.

Embodiment 2

A method for preparing an iron-carbon composite includes the following steps.

(1) Acid-pickled iron powder is prepared: 500 g of reduction iron powder is milled to 400 meshes, put in 1000 mL of 0.05 mol/L sulfuric acid, stirred for 4 min, then subjected to reduced-pressure filtration, washed with deionized water till a pH value of a filtrate reaches 7.3, dried in a vacuum oven at 50° C. for 2 h, and stored in an oxygen-free environment.

(2) Cross-linking and curing are carried out: graphite is milled to 400 meshes to obtain graphite powder; 400 g of dry acid-pickled iron powder, 50 g of graphite powder and 15 g of sodium alginate powder are taken for preparing a total of 465 g of mixed powder, the mixed powder is added into 1.86 kg of 70° C. water under stirring, continuous stirring is performed for 10 min, a whole suspension is uniform without particle aggregation and has a certain viscosity, and a suspension is obtained; and under the stirring condition, the suspension is pumped into a $ZnCl_2$ solution with a mass percentage concentration of 2% at a pumping speed of 5 mL/min through a flexible tube with an internal diameter of 0.5 mm, still standing is performed for 30 min, then a screen with a mesh diameter of 1 mm is used for dispersing the iron-carbon composite material, then the iron-carbon composite material is put in the vacuum oven and dried at 40° C. for 10 h, then a cross-linked and cured iron-carbon composite material is obtained and stored in the oxygen-free environment, 25 particles of the cross-linked and cured iron-carbon composite material are taken randomly and each have a particle diameter in a range from 1.2 mm to 3 mm measured by a vernier caliper, and an average particle diameter is 1.82 mm.

(3) Mineralization is performed by using a mineralization bacterium:
  a bacteria solution is prepared: 25 g of *Myxococcus xanthus* powder, 20 g of ammonium sulfate and 12 g of urea are weighed and mixed, 1 L of water is added, a pH value is adjusted to be 6.55, fermentation culture is performed for 36 h under a condition of 28° C., and then $OD_{600}$ of an obtained bacteria solution is 3.2;
  mineralization treatment is performed: the cross-linked and cured iron-carbon composite material obtained in step (2) is put in the screen with the mesh diameter of 1 mm, soaked in the bacteria solution for 5 min and then taken out;
  dispersion and bacteria solution leaching are performed: the iron-carbon composite material is put in a hierarchical oscillation sieve to be horizontally oscillated for 30 s; a mesh diameter of an upper layer is 2.0 mm for implementing dispersion of the iron-carbon composite material; and a mesh diameter of a lower layer is 0.5 mm for leaching out redundant bacteria solutions; and
  drying is carried out: the mineralized iron-carbon composite material is put in the vacuum oven to be dried at 60° C. for 3 h, 25 particles are taken randomly and each have a particle diameter in a range from 1.5 mm to 3.3 mm measured by the vernier caliper, and an average particle diameter is 2.19 mm.

Embodiment 3

A method for preparing an iron-carbon composite includes the following steps.

(1) Acid-pickled iron powder is prepared: 500 g of reduction iron powder is milled to 300 meshes, put in 1000 mL of 0.5 mol/L phosphoric acid, stirred for 3 min, then subjected to reduced-pressure filtration, washed with deionized water till a pH value of a filtrate reaches 7.1, dried in a vacuum oven at 50° C. for 3 h, and stored in an oxygen-free environment.

(2) Cross-linking and curing are carried out: biological activated carbon is milled to 300 meshes to obtain activated carbon powder; 200 g of dry acid-pickled iron powder, 150 g of activated carbon powder and 30 g of sodium alginate powder are taken for preparing a total of 380 g of mixed powder, the mixed powder is added into 2.53 kg of 50° C. water under stirring, continuous stirring is performed for 15 min, a whole suspension is uniform without particle aggregation and has a certain viscosity, and a suspension is obtained; and under the stirring condition, the suspension is pumped into a $CaCl_2$) solution with a mass percentage concentration of 6% at a pumping speed of 15 mL/min through a flexible tube with an internal diameter of 0.5 mm, still standing is performed for 90 min, then a screen with a mesh diameter of 1 mm is used for dispersing the iron-carbon composite material, then the iron-carbon composite material is put in the vacuum oven and dried at 60° C. for 6 h, then a cross-linked and cured iron-carbon composite material is obtained and stored in the oxygen-free environment, 25 particles of the cross-linked and cured iron-carbon composite material are taken randomly and each have a particle diameter in a range from 1.2 mm to 3 mm measured by the vernier caliper, and an average particle diameter is 1.80 mm.

(3) Mineralization is performed by using a mineralization bacterium:
  a bacteria solution is prepared: 30 g of *Bacillus pasteurii* powder, 15 g of ammonium sulfate and 15 g of urea are weighed and mixed, 1 L of water is added, a pH value is adjusted to be 9.0, fermentation culture is performed for 24 h under a condition of 37° C., and then $OD_{600}$ of an obtained bacteria solution is 1.5;
  mineralization treatment is performed: the cross-linked and cured iron-carbon composite material obtained in step (2) is put in the screen with the mesh diameter of 1 mm, immersed in the bacteria solution for 7 min and then taken out;

dispersion and bacteria solution leaching are performed: the iron-carbon composite material is put in a hierarchical oscillation sieve to be horizontally oscillated for 45 s; a mesh diameter of an upper layer is 4.0 mm for implementing dispersion of the iron-carbon composite material; and a mesh diameter of a lower layer is 3.0 mm for leaching out redundant bacteria solutions; and drying is carried out: the mineralized iron-carbon composite material is put in the vacuum oven to be dried at 40° C. for 5 h, 25 particles are taken randomly and each have a particle diameter in a range from 1.7 mm to 3.3 mm measured by the vernier caliper, and an average particle diameter is 2.47 mm.

Embodiment 4

This embodiment provides a method for preparing an iron-carbon composite material, which has a difference from Embodiment 1 that in mineralization treatment of step (3), the cross-linked and cured iron-carbon composite material is immersed in a bacteria solution for 15 min, and the rest of steps and parameter conditions are the same as those in Embodiment 1.

Comparative Example 1

This comparative example provides a method for preparing an iron-carbon composite material, which has an only difference from Embodiment 1 that the step of performing mineralization by a mineralization bacterium is omitted, and the rest of steps and parameter conditions are the same as those in Embodiment 1.

Comparative Example 2

This comparative example provides a method for preparing an iron-carbon composite material, which has a difference from Embodiment 1 that in mineralization treatment of step (3), the cross-linked and cured iron-carbon composite material is immersed in a bacteria solution for 1 min, and the rest of steps and parameter conditions are the same as those in Embodiment 1.

Comparative Example 3

This comparative example provides a method for preparing an iron-carbon composite material, which has a difference from Embodiment 1 that in mineralization treatment of step (3), the cross-linked and cured iron-carbon composite material is immersed in a bacteria solution for 30 min, and the rest of steps and parameter conditions are the same as those in Embodiment 1.

Comparative Example 4

This comparative example provides a method for preparing an iron-carbon composite material, which has a difference from Embodiment 1 that an iron-carbon composite material is prepared in a sintering curing manner in step (2), and the rest of steps and parameters are the same as those in Embodiment 1. The sintering curing step is shown in the following details:

biological activated carbon is milled to 200 meshes to obtain activated carbon powder; 375 g of dry acid-pickled iron powder, 100 g of activated carbon powder, 135 g of water and 75 g of Baerlocher heat stabilizer 340RF are used for preparing a total of 685 g of mixed powder, and after mixing, granulating is performed through a disk grain making machine; and then heating is performed to reach 200° C. under an anoxic condition for sintering for 30 min, and cooling is performed to reach a room temperature in a vacuum dry environment.

Experimental Example 1

Compressive strengths of iron-carbon composite materials prepared by Embodiments 1 to 4 and Comparative examples 1 to 2 are tested according to GB/T 10516-2012 Determination of average crushing strength for nitrophosphate.

Meanwhile, 10 g of each of the above iron-carbon composite materials is weighed respectively and put in 100 mL of 30 mg/L $Cr^{6+}$ solution for three days, and then a shape of each of the iron-carbon composite material is observed. Results are shown in Table 1.

TABLE 1

Compressive strengths and shapes after use of different iron-carbon composite materials

| | Compressive strength (MPa) | Shape of iron-carbon composite material after three days |
|---|---|---|
| Embodiment 1 | 2.31 | There is no obvious change of the shape and no phenomenon of disintegration or crushing |
| Embodiment 2 | 1.13 | There is no obvious change of the shape and no phenomenon of disintegration or crushing |
| Embodiment 3 | 1.32 | There is no obvious change of the shape and no phenomenon of disintegration or crushing |
| Embodiment 4 | 4.89 | There is no obvious change of the shape and no phenomenon of disintegration or crushing |
| Comparative example 1 | 0.33 | A spherical shape is lost, and disintegration of the iron-carbon composite material causes a large amount of black fine powder |
| Comparative example 2 | 0.40 | It may be seen that part of small spheres are disintegrated, and disintegration of the iron-carbon composite material causes a large amount of black fine powder |

It may be seen from the data in the above table that in the present disclosure, through a mineralization technology by using the mineralization bacterium, the alkaline earth metal carbonate protective film is formed on the surface of the iron-carbon composite material, so the compressive strength of the iron-carbon composite material is improved remarkably, which can meet the requirement of the mechanical strength in the in-situ injection technology or the permeable reactive barrier technology; and after use for three days, an original shape may still be maintained without the phenomenon of disintegration or crushing, and the iron-carbon composite material may continue playing a role in treating sewage. Comparative example 1 omits the step of mineralization treatment by the mineralization bacterium, time for the mineralization treatment by the mineralization bacterium in Comparative example 2 is 1 min, the compressive strength of each of the iron-carbon composite materials is low, the phenomenon of disintegration occurs after use for three days, and the composite material cannot continue playing a role in treating sewage, which further proves that the mineralization treatment can improve the strength of the iron-carbon composite material, maintain the original shape of the iron-carbon composite material and prolong the service life.

Experimental Example 2

A specific method for testing the capacity of treating sewage by iron-carbon composite materials prepared by Embodiments 1 to 4 and Comparative examples 3 to 4 is: respectively weighing 10 g of the iron-carbon composite material, putting the weighed material in a conical flask, adding 100 mL of 30 mg/L $Cr^{6+}$ solution, putting the conical flask in an oscillator to be oscillated at 110 rpm for 1 h, sampling and measuring a concentration of $Cr^{6+}$ according to GB/T 7467-1987 Water quality—Determination of chromium(VI)—1,5 Dtphenylcarbohydrazide spectrophotometric method; and then still standing, sampling after 12 h, 24 h, 48 h and 72 h respectively, measuring the concentration of $Cr^{6+}$, and calculating a $Cr^{6+}$ reduction rate. Results are shown in Table 2.

The $Cr^{6+}$ reduction rate (%) is equal to (a $Cr^{6+}$ concentration in sewage before treatment minus a $Cr^{6+}$ concentration in sewage after treatment) divided by a $Cr^{6+}$ concentration in sewage before treatment.

A method for preparing the 30 mg/L $Cr^{6+}$ solution is: taking 3 mL of 1000 μg/mL hexavalent chromium solution standard substance, and adding water to a constant volume of 100 mL to obtain the 30 mg/L $Cr^{6+}$ solution.

TABLE 2

Capacities of reducing $Cr^{6+}$ by different iron-carbon composite materials

| | $Cr^{6+}$ reduction rate (%) | | | | |
|---|---|---|---|---|---|
| | 1 h | 12 h | 24 h | 48 h | 72 h |
| Embodiment 1 | 95.29 | 96.54 | 97.04 | 97.33 | 97.47 |
| Embodiment 2 | 96.61 | 97.48 | 97.91 | 98.11 | 98.22 |
| Embodiment 3 | 95.78 | 96.87 | 97.58 | 97.87 | 98.04 |
| Embodiment 4 | 83.48 | 83.97 | 84.14 | 84.20 | 84.25 |
| Comparative example 3 | 28.41 | 28.57 | 28.66 | 28.68 | 28.70 |
| Comparative example 4 | 25.29 | 26.54 | 27.04 | 27.33 | 27.47 |

It may be seen from the data in the above table that the mineralization time of Embodiments 1 to 4 of the present disclosure is in a range from 5 min to 15 min, and the obtained iron-carbon composite material can effectively treat $Cr^{6+}$ in sewage. The mineralization time of Comparative example 3 is 30 min, too long film-coating time causes a compact alkaline earth metal carbonate film formed on the surface of the iron-carbon composite material, which cannot contact with sewage for sewage remediation, and consequently, efficiency of hexavalent chromium remediation is reduced remarkably; and Comparative example 4 adopts a sintering curing manner for preparing the iron-carbon composite material and then adopts the same manner for mineralization treatment, however, a slow release porous channel inside the iron-carbon composite material is sealed due to sintering curing, so the effect on sewage treatment is poor.

Experimental Example 3

Figure 3:
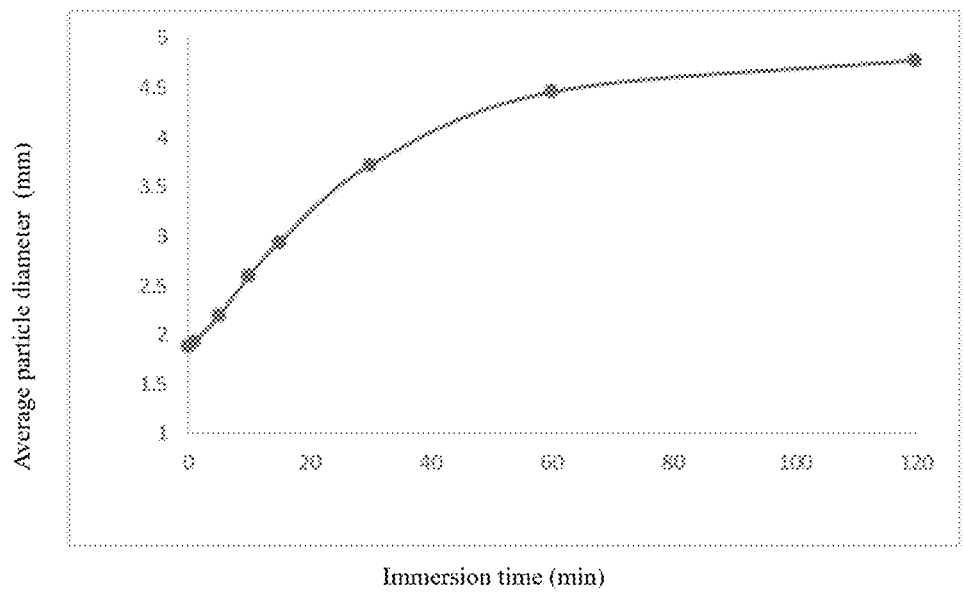
FIG. 3 is a diagram of a relationship between different soaking time in a mineralization bacteria solution and a particle diameter of an iron-carbon composite material in Experimental example 3.
Figure 4:
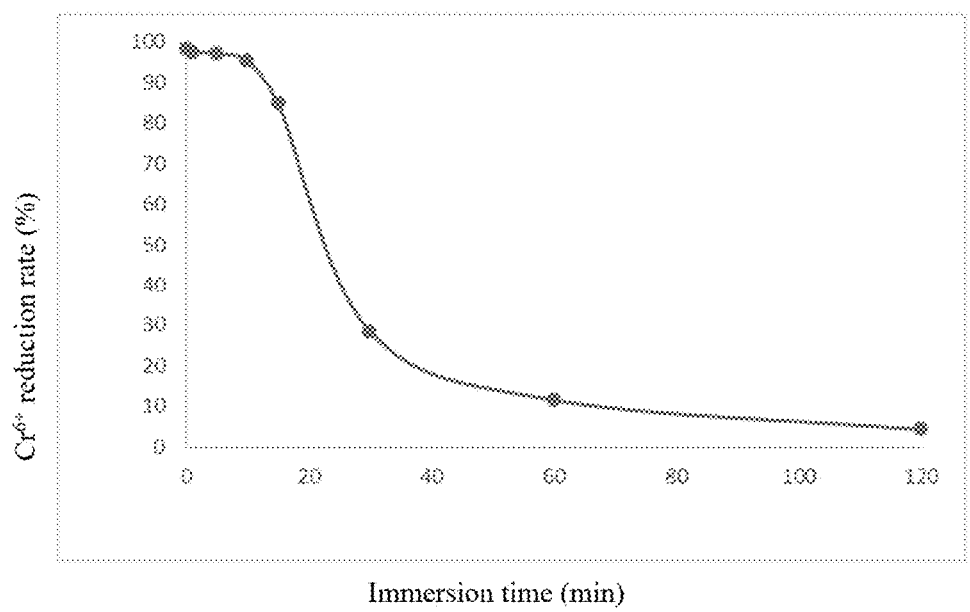
FIG. 4 is a diagram of a relationship between a $Cr^{6+}$ reduction rate and soaking time after sewage containing $Cr^{6+}$ is treated for 1 h by an iron-carbon composite material which is soaked in a mineralization bacteria solution for different time in Experimental example 3.
Figure 5:
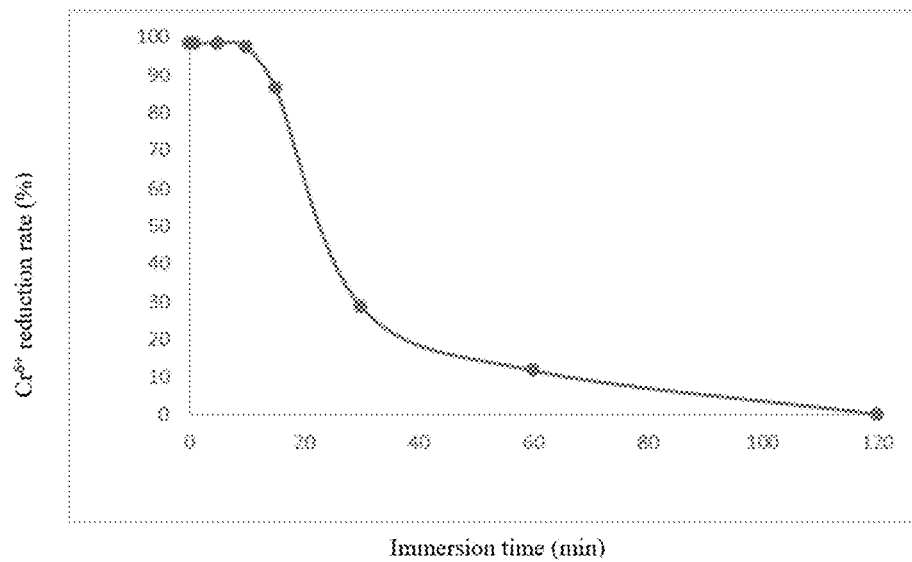
FIG. 5 is a diagram of a relationship between a $Cr^{6+}$ reduction rate and soaking time after sewage containing $Cr^{6+}$ is treated for three days by an iron-carbon composite material which is soaked in a mineralization bacteria solution for different time in Experimental example 3.
Figure 6:
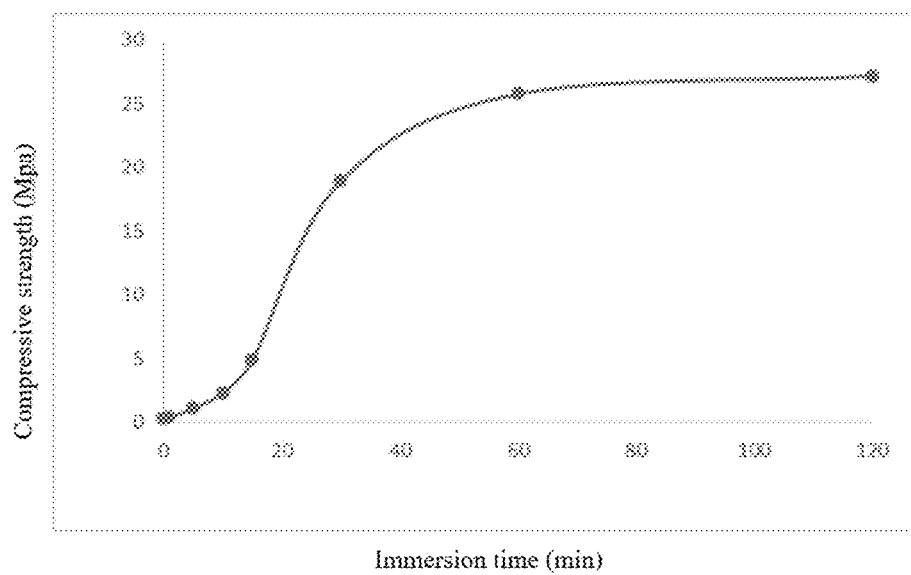
FIG. 6 is a diagram of a relationship between different soaking time in a mineralization bacteria solution and a compressive strength of an iron-carbon composite material in Experimental example 3.

The cross-linked and cured iron-carbon composite material is prepared according to the preparation method of Embodiment 1, there are seven groups, one of the seven groups is not subjected to mineralization by a mineralization bacterium (recorded as 0 min), the six other groups are subjected to mineralization treatment by the mineralization bacterium, soaking is performed in a mineralization bacteria solution for 5 min, 10 min, 15 min, 30 min, 60 min and 120 min respectively, and the rest of steps and parameter conditions are the same as those in Embodiment 1. Influence of different mineralization time on a particle diameter of the iron-carbon composite material, a $Cr^{6+}$ reduction capacity and a compressive strength are studied, a measuring method for the compressive strength and the $Cr^{6+}$ reduction capacity is the same as experimental example 1 and experimental example 2, the particle diameter is measured by using a vernier caliper, five particles are selected randomly from each group to measure the particle diameters of them respectively, and an average value is obtained. Results are shown in Table 3 and FIGS. 3 to 6.

TABLE 3

Influence of different soaking time on performance of the iron-carbon composite material

| | Immersion time | | | | | | | |
|---|---|---|---|---|---|---|---|---|
| | 0 min | 1 min | 5 min | 10 min | 15 min | 30 min | 60 min | 120 min |
| Average particle diameter (mm) | 1.88 | 1.93 | 2.19 | 2.60 | 2.94 | 3.72 | 4.46 | 4.78 |
| 1 h $Cr^{6+}$ reduction rate | 98.23 | 97.48 | 97.17 | 95.29 | 84.79 | 28.41 | 11.56 | 4.27 |
| 3 days $Cr^{6+}$ reduction rate (%) | 98.28 | 98.25 | 98.46 | 97.47 | 86.71 | 28.70 | 11.71 | 0.18 |
| Compressive strength (Mpa) | 0.33 | 0.40 | 1.13 | 2.31 | 4.89 | 18.97 | 25.78 | 27.18 |

It may be seen from the data in the above table that the particle diameter of the iron-carbon composite material depends on formation of a calcium carbonate film on the surface of the iron-carbon composite material due to a mineralization action of the mineralization bacterium. A growth process of the calcium carbonate film may be simplified to three phases: a contact period before the $5^{th}$ min, in this phase, a microorganism just contacts with calcium ions on a surface of a slow release material, and synthesis of the calcium carbonate film is slow due to a lack of a crystal nucleus and a supporting skeleton. In a quick growth period between $5^{th}$ min and $60^{th}$ min, after contact in the previous 5 min, the microorganism synthesizes a small quantity of calcium carbonate at a plurality of sites on the surface of the slow release material, afterwards, the microorganism uses the calcium carbonate synthesized before the $5^{th}$ min as a crystal nucleus and a skeleton for starting synthesis of a large quantity of calcium carbonate, and connection gradually occurs to form a complete calcium carbonate film. In a stable phase after the $60^{th}$ min, the calcium carbonate formed previously gradually forms a cover on surfaces of the particles, the microorganism outside is blocked from continuing reacting with the calcium ions released inside the particles, then the calcium carbonate cannot continue to be formed to cover the surfaces of the particles, and thus the particle diameter tends to be constant.

As for the $Cr^{6+}$ reduction rate at 1 h, the calcium carbonate film formed in an initial stage of mineralization has a large influence on the particle diameter, but it is not a contact calcium carbonate structure, so a reduction material inside the iron-carbon composite material may still be released. However, generation of calcium carbonate 15 min later simultaneously improves the particle diameter and compactness of the calcium carbonate film, so the reduction iron-carbon composite material inside is more and more difficult to release, and a reduction action is weakened gradually.

After treating $Cr^{6+}$ for three days, treatment of immersion for less than 15 min still has a further reduction effect in the still standing process, and treatment for longer than 15 min almost does not further reduce $Cr^{6+}$. It shows that the calcium carbonate produced by long-time immersion is compact, which blocks releasing of the internal reduction material.

As for the compressive strength, change of compactness of a mineralized film may be seen clearly. A strength of a mineralized film generated before the $5^{th}$ min is low, but between the $10^{th}$ min and $60^{th}$ min, the mineralized film grows quickly and tends to be more compact, which results in remarkable increase of the material compressive strength and remarkable improvement of hardness.

To sum up, the immersion time is controlled to be in a range from 5 min to 15 min, especially, 5 min to 10 min, on the one hand, the generated calcium carbonate does not seal a surface of a small sphere, and a reduction effect of the material may be maintained; and on the other hand, the compressive strength of the iron-carbon composite material may be improved to a certain degree, and the material may be prevented from being crushed in a use process.

Apparently, the above embodiments are merely examples for clear description, but not for limiting the implementations. Those ordinarily skilled in the art can also make modifications or variations in other different forms based on the above description. All implementations do not need to be and cannot be exhaustively cited here. Apparent modifications or variations derived from this still fall within the protection scope of the present disclosure.

The invention claimed is:

1. A method for preparing an iron-carbon composite material, wherein the method comprises the following steps:
   a step for preparing acid-pickled iron powder: acid-pickling iron powder to obtain acid-pickled iron powder;
   a cross-linking and curing step:
      mixing the acid-pickled iron powder, the carbon powder, the cross-linking agent and water,
      then adding the mixture into an alkaline earth metal salt solution for still standing, and
      carrying out solid-liquid separation and drying to obtain a cross-linked and cured iron-carbon composite material; and
   a mineralization treatment step: soaking the cross-linked and cured iron-carbon composite material in a mineralization bacteria solution for 5-15 min, and carrying out drying to obtain an iron-carbon composite material; wherein:
   the cross-linking agent is sodium alginate;
   an optical density of the mineralization bacteria solution at 600 nm ranges from 1 to 5; and
   a mass ratio of the acid-pickled iron powder to the carbon powder to the cross-linking agent is (40-80):(10-30):(3-6).

2. The method according to claim 1, wherein the soaking time ranges from 5 min to 10 min.

3. The method according to claim 1, wherein:
   a mineralization bacterium is selected from one or more of *Myxococcus xanthus*, sulfate reducing bacteria, denitrifying bacteria and *Bacillus pasteurii*; and/or
   the carbon powder is selected from one or both of activated carbon and graphite; and/or
   the alkaline earth metal salt is selected from one or both of calcium chloride and calcium nitrate.

4. The method according to claim 1, wherein an optical density of the mineralization bacteria solution at 600 nm ranges from 1 to 3.

5. The method according to claim 1, wherein the step for preparing the acid-pickled iron powder comprises: soaking iron powder in a 0.05-0.5 mol/L acid solution for at least 3 min, then carrying out solid-liquid separation, and washing to neutral pH.

6. The method according to claim 1, wherein the alkaline earth metal salt solution has a mass percentage concentration ranging from 2% to 6%.

* * * * *